(12) United States Patent
Novello et al.

(10) Patent No.: US 7,701,940 B2
(45) Date of Patent: Apr. 20, 2010

(54) INTER-DOMAIN POINT-TO-MULTIPOINT PATH COMPUTATION IN A COMPUTER NETWORK

(75) Inventors: Stefano Novello, Concord, MA (US); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 409 days.

(21) Appl. No.: 11/684,313

(22) Filed: Mar. 9, 2007

(65) Prior Publication Data

US 2008/0219272 A1    Sep. 11, 2008

(51) Int. Cl.
- *H04L 12/28* (2006.01)
- *H04L 12/16* (2006.01)
- *H04L 12/46* (2006.01)

(52) U.S. Cl. .................. 370/390; 370/229; 370/236; 370/254; 370/389; 370/396; 370/546

(58) Field of Classification Search .............. 370/254, 370/465, 251, 229, 236, 390, 389, 396, 546
See application file for complete search history.

(56) References Cited

U.S. PATENT DOCUMENTS

| | | | |
|---|---|---|---|
| 6,256,309 B1 | 7/2001 | Daley et al. | |
| 6,370,119 B1 | 4/2002 | Basso et al. | |
| 6,529,498 B1 | 3/2003 | Cheng et al. | |
| 6,934,249 B1 | 8/2005 | Bertin et al. | |
| 7,042,838 B1 | 5/2006 | Shand et al. | |
| 7,065,077 B1 | 6/2006 | Radhakrishnan et al. | |
| 7,065,079 B1 | 6/2006 | Patra et al. | |
| 2006/0039391 A1 | 2/2006 | Vasseur et al. | |
| 2006/0098587 A1 | 5/2006 | Vasseur et al. | |
| 2006/0098657 A1 | 5/2006 | Vasseur et al. | |
| 2006/0171320 A1* | 8/2006 | Vasseur et al. | 370/238 |
| 2006/0176820 A1* | 8/2006 | Vasseur et al. | 370/241 |

OTHER PUBLICATIONS

Awduche, D., Network Working Group Request for Comments 3209, entitled "RSVP-TE: Extensions to RSVP for LSP Tunnels," IETF, Dec. 2001, pp. 1-57.

(Continued)

*Primary Examiner*—Dang T Ton
*Assistant Examiner*—Robert M Morlan
(74) *Attorney, Agent, or Firm*—Cesari and McKenna, LLP

(57) ABSTRACT

In one embodiment, distributed path computation elements (PCEs) collaboratively build local portions of an inter-domain P2MP path to each path destination or to each ingress border router of one or more respective successor domains based on a cost associated with using one or more local ingress border routers received from each predecessor domain. Once a furthest destination is reached, each PCE may recursively return a list of local ingress border routers used in the P2MP path to each predecessor domain, where each PCE receiving the list correspondingly prunes segments of its computed local portion of the P2MP path that lead to unused successor ingress border routers, and sends a prune message to its predecessor domains accordingly. A root PCE receives the final prune message(s) and a representation of each locally computed portion of the inter-domain P2MP path, and combines the portions into a final inter-domain P2MP path.

29 Claims, 11 Drawing Sheets

OTHER PUBLICATIONS

Smith, H., Network Working Group Request for Comments 3784, entitled "Intermediate-System-to-Intermediate-System (IS-IS) Extensions for Traffic Engineering (TE)," IETF, Jun. 2004, pp. 1-13.

Katz, D et al, Network Working Group Request for Comments 3630, entitled "Traffic Engineering (TE) Entensions to OSPF Version 2," IETF, Sep. 2003, pp. 1-14.

Farrel, A., et al, Network Working Group Request for Comments 4655, entitled "A Path Computation Element (PCE)-Based Architecture," IETF, Aug. 2006, pp. 1-38.

Vasseur, et al., Networking Working Group Internet Draft, entitled "Path Computation Element (PCE) Communication Protocol (PCEP) (draft-ietf-pce-pcep-07.txt)," Mar. 2007, pp. 1-65.

* cited by examiner

INTER-DOMAIN POINT-TO-MULTIPOINT PATH COMPUTATION IN A COMPUTER NETWORK

TECHNICAL FIELD

The present disclosure relates generally to computer networks, and, more particularly, to computation of inter-domain point-to-multipoint (P2MP) paths for tunnels within computer networks.

BACKGROUND

Path computation for tunnels of a computer network, e.g., label switched paths (LSPs), may be performed by head-end nodes of the tunnels, or by specialized Path Computation Elements (PCEs). For example, tunnels in many Multi-Protocol Label Switching (MPLS) Traffic Engineering (TE) networks (e.g., MPLS TE-LSPs) are computed using a constrained shortest path first (CSPF) algorithm, which offers high flexibility/scalability, and is well-equipped to handle frequent topology changes, dynamic traffic demands, and resource availability changes. While head-end nodes of tunnels may often be equipped to compute a suitable path for a tunnel, PCEs offer a variety of benefits not generally available to head-end nodes. For instance, PCEs may have advanced knowledge of the network topology, such as knowledge of existing tunnels through the network of which the head-end nodes may not be aware, visibility in other domains, etc. In addition, PCEs may be configured to communicate with other PCEs, such as for inter-domain (inter-area and/or inter-Autonomous-System, "inter-domain") path computation.

Accordingly, a path computation client (PCC), such as a head-end node, may send a request to a locally-reachable PCE to compute a path for a tunnel to one or more desired destinations (e.g., possibly with one or more constraints, as will be understood by those skilled in the art). In situations where a destination is beyond the knowledge of the local PCE, the local PCE may forward the request to a remote (next-hop/downstream) PCE, e.g., in a different domain, to continue the computation of the path; thus the local PCE acts as a PCC to the cooperating remote PCE. The remote PCE may further forward the request to other remote PCEs toward the destination and so on, until a final PCE (local to the destination) is reached. Each remote PCE may then return its local portion of one or more computed paths to its upstream PCE (that is, the PCC from which each PCE received the forwarded request), which may then compute its respective portion based on the received portions of the computed path(s). In this manner, a "path computation chain" or "PCE chain" is established, i.e., along a path of PCEs used to compute the path to the destination (e.g., also referred to as "recursive path computation," as may be understood by those skilled in the art).

Generally, inter-domain point-to-multipoint (P2MP) paths (i.e., one source and a plurality of destinations across a plurality of domains, also referred to as inter-domain P2MP trees) are particularly difficult to compute, even for a distributed PCE architecture. For instance, while the recursive path computation mentioned above may be well-suited for point-to-point (P2P) paths, P2MP path computation involves multiple branching path segments from the source to the plurality of destinations. As such, inter-domain P2MP path computation may result in a plurality of per-domain path options that may be difficult to coordinate efficiently and effectively between domains. That is, where one or more domains have a plurality of ingress and/or egress border routers, there is currently no known technique for one domain to determine which border routers another domain will utilize for the inter-domain P2MP tree, and to limit the computation of the P2MP tree to those utilized border routers. Also, such per-domain path computation may result in a merging of segments of the P2MP tree, e.g., where two or more diverse segments from one domain are merged in a downstream domain, thus rendering the diverse segments in the upstream domain substantially unnecessary/inefficient (and, as will be understood by those skilled in the art, contrary to the conventional structure and use of a P2MP tree).

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
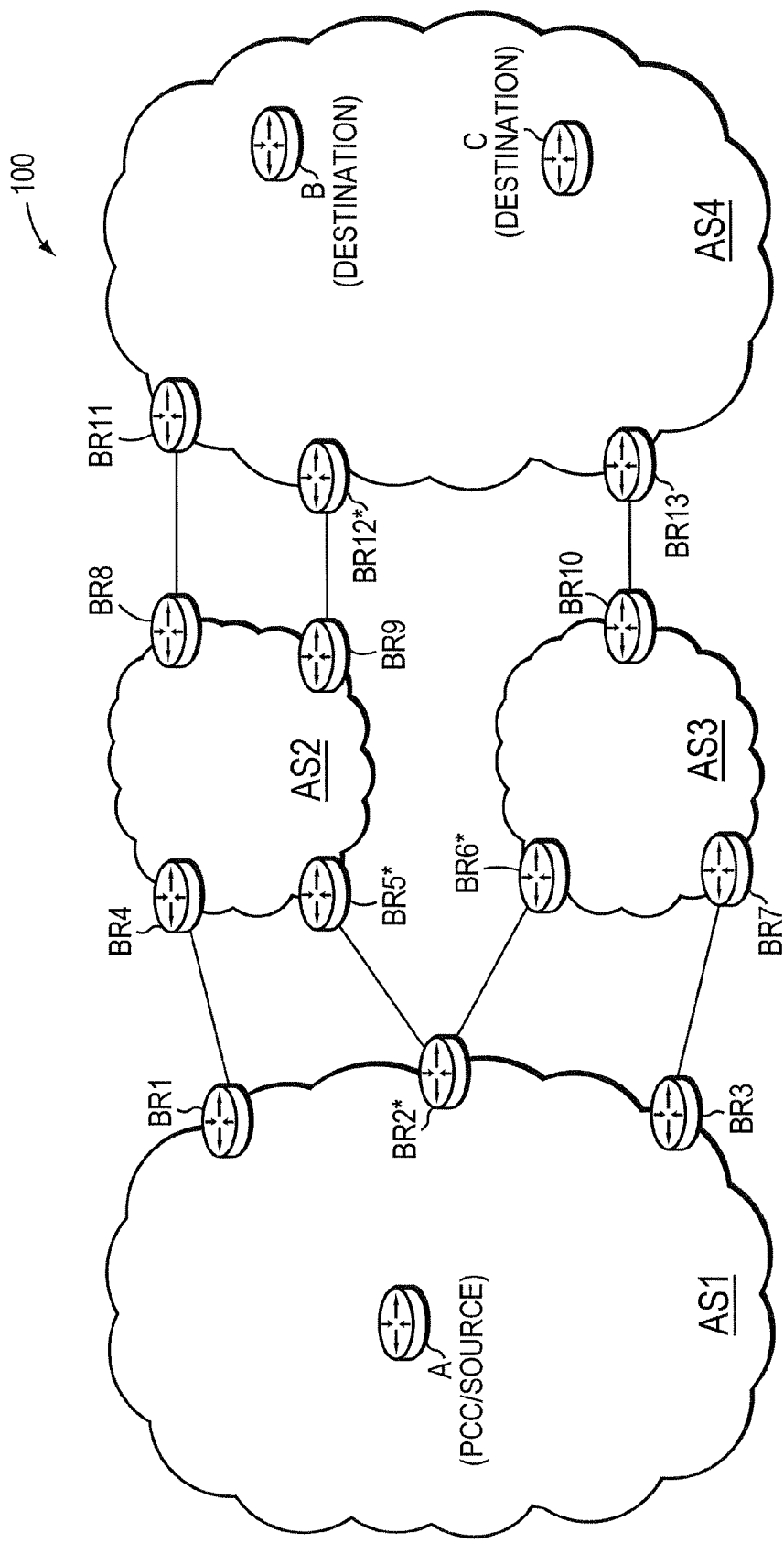
FIG. 1 illustrates an example computer network.

According to embodiments of the disclosure, a path computation client (PCC) in a source domain requests path computation for an inter-domain point-to-multipoint (P2MP) path to a plurality of destinations in one or more successor (downstream) domains. Distributed path computation elements (PCEs) in each successor domain along an inter-domain chain to the destinations collaboratively construct local portions of the P2MP path to each path destination within their local domain and/or to each ingress border router of a respective successor domain to the destination(s). Construction of the local portions of the P2MP path is based on one or more received costs associated with using one or more local ingress border routers of the PCEs' local domain from each predecessor (upstream) domain. Once a furthest destination is reached (i.e., in a domain with no successor domains), each PCE of a successor domain may recursively return to one or more PCEs of its predecessor domain a list of local ingress border routers used in the P2MP path. Each PCE receiving the list correspondingly prunes one or more segments of its constructed local portion(s) of the P2MP path that lead to unused successor ingress border routers, and sends a prune message to its predecessor domain accordingly. A root PCE in the source domain receives the final prune message(s) and a representation of each locally constructed portion of the inter-domain P2MP path, and combines the portions into a final inter-domain P2MP path.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an example computer network 100 illustratively comprising a plurality of domains (e.g., ASes) AS1-AS4 interconnected by border routers (BRs, labeled as "BR1-BR13") and inter-domain links as shown. Nodes within the domains may be present that may interconnect to BRs of each domain, as will be understood by those skilled in the art. Illustratively, node A in AS1, and nodes B and C in AS4 are shown, which may be interconnected by one or more paths, each of which may comprise one or more particular links/nodes not shown for ease of discussion. Those skilled in the art will understand that any number of nodes, routers, links, etc. may be used in the computer network, and that the view shown herein is for simplicity. Further, those skilled in the art will also understand that while the present invention is described generally in relation to multiple ASes, it may apply to any inter-domain network configuration, e.g., inter-AS, inter-area, inter-level, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
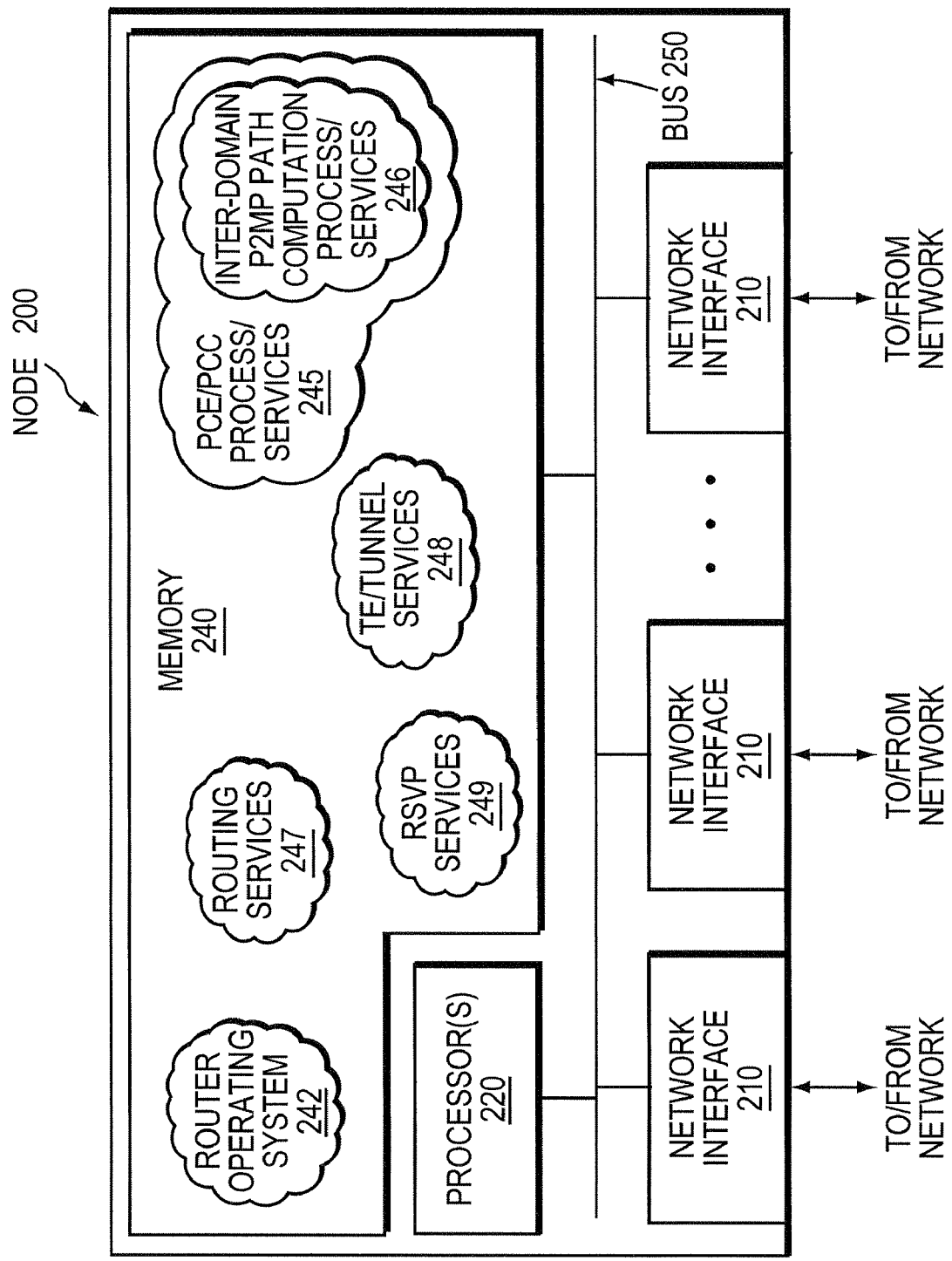
FIG. 2 illustrates an example network device/node.

FIG. 2 is a schematic block diagram of an example node/router 200 that may be advantageously used with one or more embodiments described herein, e.g., as a Path Computation Element (PCE) or Path Computation Client (PCC), as detailed below. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing services 247, Traffic Engineering (TE)/Tunnel services 248, Resource ReSerVation Protocol (RSVP) services 249, and as described herein, an example PCE/PCC process/service 245, particularly with inter-domain point-to-multipoint (P2MP) path computation process/services 246. It will be apparent to those skilled in the art that other processor and memory means, including various computer-readable media, may be used to store and execute program instructions pertaining to the inventive technique described herein.

Routing services 247 contain computer executable instructions executed by each processor 220 to perform functions provided by one or more routing protocols, such as the Interior Gateway Protocol (IGP, e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs.

Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages, while TE/tunnel services 248 contain computer executable instructions for implementing TE and tunnel functions. A TE Database (TED, not shown) may be illustratively resident in memory 240 and used to store TE information provided by the routing protocols, such as IGP, BGP, and/or RSVP (e.g., with TE extensions). The TED may be illustratively maintained and managed by TE/tunnel services 248.

Tunnels, e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a Path Computation Element (PCE) not necessarily colocated on the head-end node (e.g., a PCE as described in RFC 4655 by Farrel, Vasseur, and Ash, entitled *A Path Computation Element (PCE)-Based Architecture*, dated August 2006, the contents of which are hereby incorporated by reference as though fully set forth herein). The head-end node (or a PCE) exploits its knowledge of network topology and resources available on each link to perform the path computation according to the LSP Traffic Engineering constraints. Various path computation methodologies are available including CSPF (constrained shortest path first). Notably, when incorporating the use of PCEs, the path computation request (and response) between path computation client (PCC) and PCE may be exchanged in accordance with a protocol specified in Vasseur, et al., *Path Computation Element (PCE) Communication Protocol (PCEP)* <draft-ietf-pcepcep-07.txt>, Internet Draft, March 2007, the contents of which are hereby incorporated by reference in its entirety. It should be understood that the use of PCEP serves only as an example, and that other communication protocols may be used in accordance with the present invention.

Figure 3:
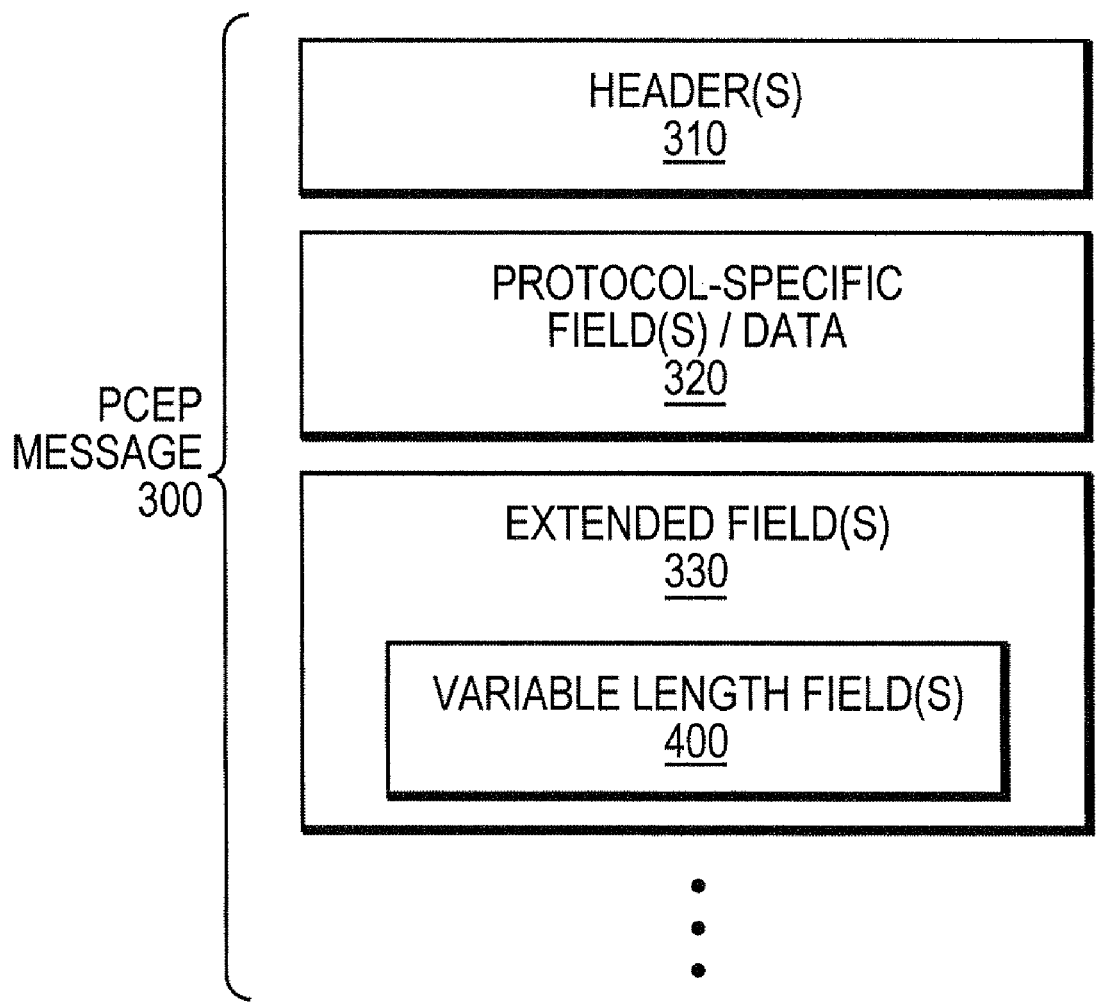
FIG. 3 illustrates an example PCEP message.

FIG. 3 is a schematic block diagram illustrating a generic PCEP message 300 that may be transmitted by nodes/devices 200 (e.g., PCCs and PCEs) in accordance with the embodiments described herein. Illustratively, the PCEP message 300 is shown as a high-level generic message, and those skilled in the art will understand that the message may comprise other fields accordingly. The PCEP message 300 includes one or more common headers 310, such as an encapsulation protocol header as well as one or more protocol-specific headers (e.g., IP headers, PCEP headers, etc.). As those skilled in the art will understand, the PCEP message 300 is sent in an encapsulation appropriate to the environment (e.g., TCP/IP, ATM, MPLS, etc.). Thus, the encapsulation protocol header of headers 310 contains information standard for the specific type of encapsulation. PCEP-specific fields/data 320 may be used to contain protocol-specific information, as will be understood by those skilled in the art. For example, a PCEP message 300 may communicate PCEP-specific information between the PCCs and PCEs accordingly, such as Request IDs, constraints/attributes, destinations, computed paths, errors, or other request/reply objects, as will be understood by those skilled in the art. In addition, an extended field(s) section 330 (e.g., an extension to protocol-specific fields) may include one or more variable length fields (TLVs) 400, to be used in accordance with one or more embodiments described herein.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
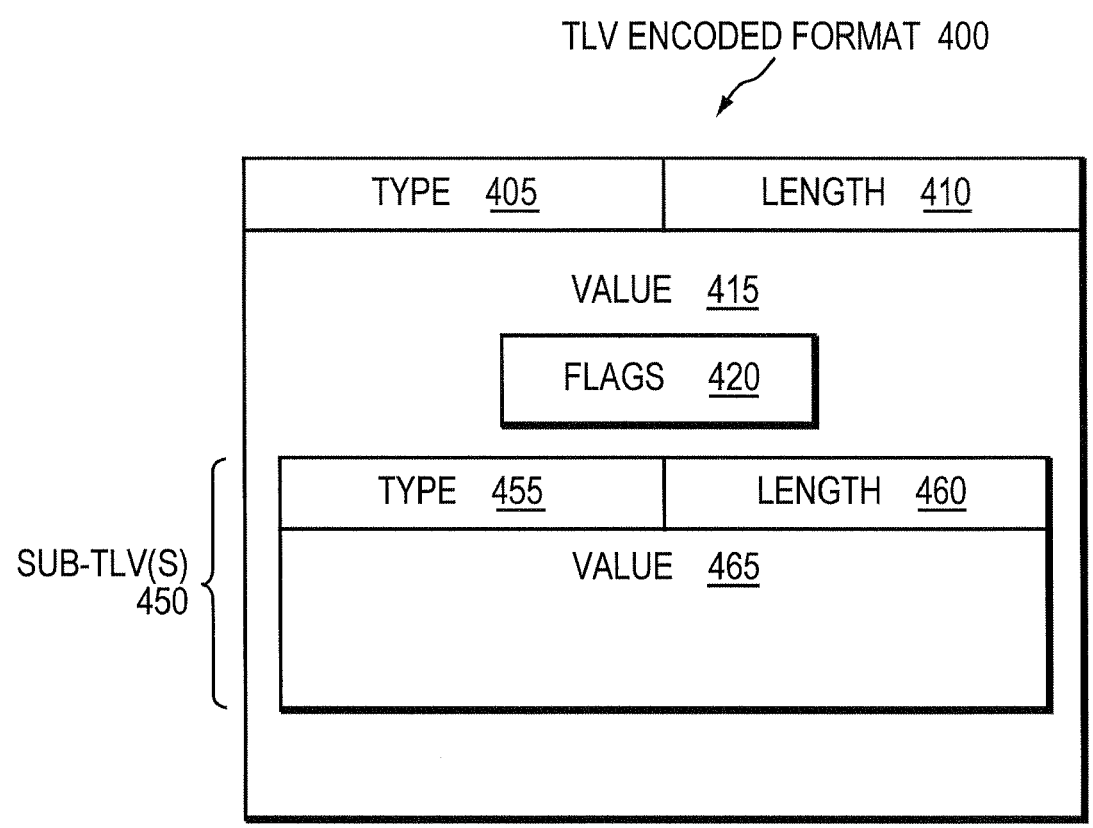
FIG. 4 illustrates an example TLV encoded format.

FIG. 4 is a schematic block diagram illustrating the TLV encoded format 400 that may be advantageously used with the one or more embodiments described herein. The TLV 400 may be used for a variable length field contained in PCEP message 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein.

One difficulty that arises in crossing domain (e.g., AS) boundaries is that path computation at the head-end node requires knowledge of network topology and resources across the entire network 100 between the head-end node (source) and tail-end node (destination). Yet service providers typically do not share this information with each other across AS borders. Also, network topology and resource information do not generally flow across area/level boundaries even though a single service provider may operate all the areas/levels. Accordingly, neither the head-end node nor any single PCE generally has sufficient knowledge to compute an inter-domain end-to-end path.

The use of PCEs has been adapted to create a distributed PCE architecture, in order to extend path computation (e.g., for tunnels) across domain (AS, area, and/or level) boundaries. An example of such a distributed (e.g., inter-domain) architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs). (VSPTs, which may be represented as virtual links made of "loose hops," are used because service providers may desire to maintain their internal network architectures and designs confidential.) One way to compute the VSPTs is by using a virtual shortest path tree (VSPT) algorithm. Generally, a VSPT is a compressed path description (entry and exit/destination points of domains) that informs a previous PCE that a destination can be reached from a set of entry nodes (associated costs may also be provided) in such a way that the internal path specifics are kept confidential from an adjacent domain.

For example, according to the VSPT algorithm, for an inter-domain path computation example such as in FIG. 1, a PCC (Node A) may first send a path computation request (e.g., PCEP message 300) to a known local PCE in its AS, such as BR2*, to compute a path to a destination (e.g., a tail-end node) such as Node B in AS4. Notably, the address of the local PCE may be manually configured or, alternatively, the PCE may advertise itself through flooding within the domain. For instance, various PCE discovery (PCED) techniques may be used that may include indications of PCE capabilities, such as the ability to compute local paths, inter-area paths, inter-AS paths, multi-domain paths, diverse paths, etc. In an illustrative embodiment, a PCED message may be contained within a conventional IGP advertisement, such as through PCED extensions as may be understood by those skilled in the art. Also, while any node in network 100 may be configured as a PCE, as used herein, nodes labeled with an asterisk "*" are illustratively PCEs for sake of discussion herein (note that the particular PCEs shown are merely representative examples).

The local PCE (BR2*) receives the path computation request and, in accordance with conventional distributed PCE path computation (as will be understood by those skilled in the art), determines whether it can compute the entire end-to-end path to the destination. If not, the first PCE may forward the request to a next-hop downstream PCE (e.g., BR5*) as determined by a known inter-domain path (e.g., to a known PCE/border router of AS2). The downstream PCE may also forward the request to BR12* (and so on, as needed) in this manner until a PCE has local knowledge of the destination. The final PCE (with local knowledge of the destination) returns a portion of a computed path (e.g., a portion of a VSPT) to the upstream PCE from which the request was received (e.g., BR5*). The upstream PCE then computes its portion of the path, and returns that portion, combined with the final portion, to the next upstream PCE, and so on, until the first PCE local to the PCC computes the complete path, and returns the results to the PCC. Thus, PCEs, in particular, may be advantageously used because of their ability to have a more complete TE topology based on communication with other PCEs. Illustratively, the chain of distributed PCEs required to compute a path from the source to the destination may be referred to herein as a "PCE chain" or a "path computation chain", as will be appreciated by those skilled in the art.

As noted, however, computation of inter-domain P2MP paths is generally difficult, even for a distributed PCE architecture. That is, P2MP path computation involves multiple branching path segments from the source to the plurality of destinations, and such inter-domain P2MP path computation may result in a plurality of per-domain path options that may be difficult to coordinate efficiently and effectively between domains. In particular, it may be difficult to prevent merging of segments of the P2MP tree by a plurality of domains, as each domain computes its own segments of the inter-domain tree.

Inter-Domain P2MP Path Computation

According to embodiments of the disclosure, a PCC in a source domain requests path computation for an inter-domain P2MP path to a plurality of destinations in one or more successor (downstream) domains. Distributed PCEs in each successor domain along an inter-domain chain to the destinations collaboratively construct local portions of the P2MP path to each path destination within their local domain and/or to each ingress border router of a respective successor domain to the destination(s). Construction of the local portions of the P2MP path is based on one or more received costs associated with using one or more local ingress border routers of the PCEs' local domain from each predecessor (upstream) domain. Once a furthest destination is reached (i.e., in a domain with no successor domains), each PCE of a successor domain may recursively return to one or more PCEs of its predecessor domain a list of local ingress border routers used in the P2MP path. Each PCE receiving the list correspondingly prunes one or more segments of its constructed local portion(s) of the P2MP path that lead to unused successor ingress border routers, and sends a prune message to its predecessor domains accordingly. A root PCE in the source domain receives the final prune message(s) and a representation of each locally constructed portion of the inter-domain P2MP path, and combines the portions into a final inter-domain P2MP path.

In an illustrative embodiment, PCE/PCC process/services 245 contain computer executable instructions executed by each processor 220 to perform functions related to PCEs and/or PCCs as will be understood by those skilled in the art and as described herein. Also, PCE/PCC process/services 245 may operate in conjunction with inter-domain P2MP path computation process/services 246 to perform functions relating to the novel techniques described herein to compute inter-domain P2MP paths.

Operationally, in accordance with one or more embodiments described herein, one or more techniques used to compute an inter-domain P2MP path/tree may be illustratively categorized into a plurality of computational/collaborative phases as described below.

—Phase I: Building a Domain-Level Directed Acyclic Graph (DAG)—

In this first illustrative phase, a PCC (e.g., source node A) of a source domain (e.g., AS1) sends a path computation request to a local PCE (e.g., BR2*) for an inter-domain P2MP path to a plurality of destinations (e.g., nodes B and C), for example, using PCEP messages 300 with provisions for such a request accordingly. The local PCE, a "root" PCE, determines the domains (e.g., AS4) to which each destination belongs (such as through conventional BGP or IGP lookup operations for ASes or areas/levels, respectively), and computes a domain-level path from its local source domain ("root" domain) to each destination domain, e.g., potentially subject to policy, as will be understood by those skilled in the art.

Figure 5:
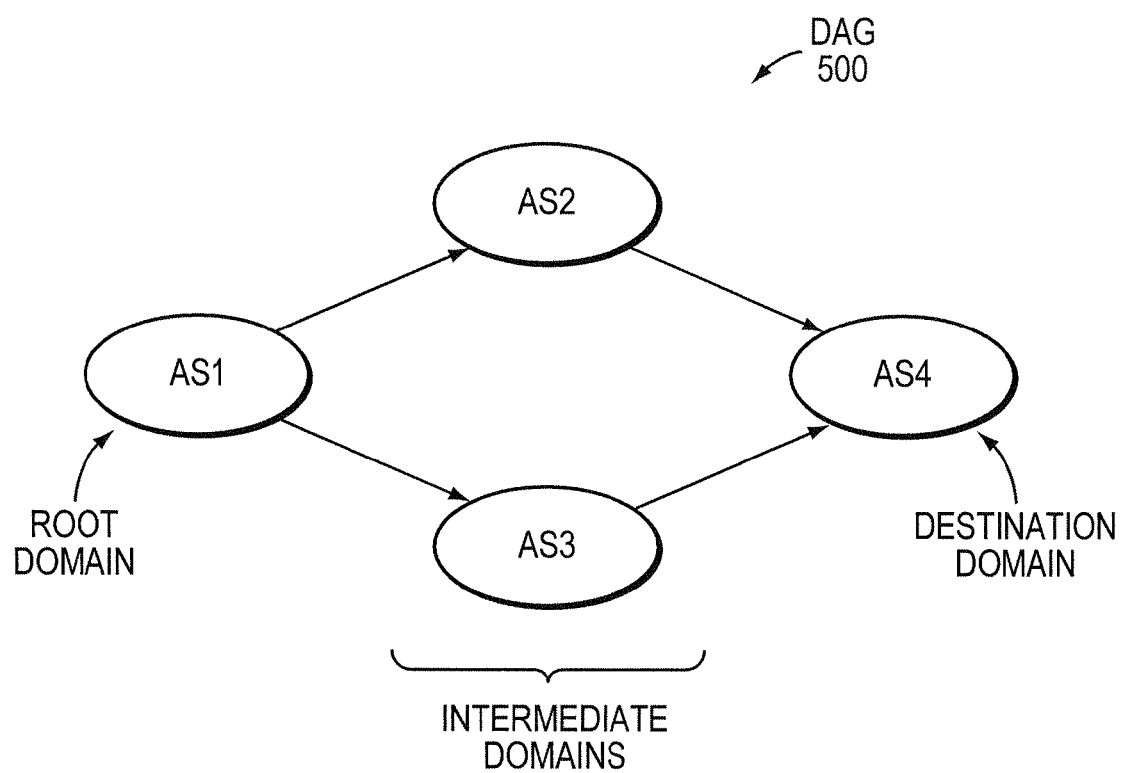
FIG. 5 illustrates and example domain-level DAG in accordance with one or more embodiments described herein.

In particular, in accordance with embodiments described herein, the root PCE computes a domain-level DAG to the destination domains, which is a high-level outline of the possible domains traversed by the inter-domain P2MP tree. FIG. 5 illustrates an example domain-level DAG 500 that may be computed by the root PCE (BR2*) to the destination domains (AS4). For example, each node (circle) of the DAG represents a domain that may be involved with computation of the inter-domain P2MP path, and each link of the DAG connecting the nodes represents a domain adjacency (e.g., representing one or more actual inter-domain links). In accordance with the network 100 of FIG. 1, a resultant domain-level DAG 500 may be produced as shown, having nodes representing domains AS1 (root domain), AS2 and AS3 (intermediate domains), and AS4 (destination domain) connected in a manner as shown in FIG. 1. Note that while ASes are shown in FIG. 1, the domains may be embodied as areas/levels, etc. (e.g., where border routers may be shared between domains). However, the DAG 500 would illustratively still comprise nodes and links as shown, where links represent a shared border router, as will be appreciated by those skilled in the art.

—Phase II: Communicating the Request to All PCEs—

In this phase, the root PCE (BR2*) generates and sends a PCEP message 300 embodied as a novel "start message" to all PCEs that manage the domains in the DAG 500. For example, PCEs BR5* (AS2), BR6* (AS3), and BR12* (AS4) may each receive the start message accordingly. Each start message 300 for each domain may illustratively comprise (e.g., in one or more TLVs 400) the P2MP path identification (ID) (or tunnel ID), a set of destinations within the respective domain, a set of predecessor (upstream) domains to the respective domain, and a set of successor (downstream) domains to the respective domain. Notably, the start message need not comprise the complete inter-domain P2MP path computation request (source to destinations), but may at least comprise any corresponding constraints of the path to be used for computation as requested by the PCC. In other words, each PCE need not be fully aware of the entire inter-domain P2MP path, but instead only of its own local portion of the path. Thus, receiving a path computation request for an inter-domain P2MP path to a plurality of destinations may simply comprise a request for a local portion of that P2MP path accordingly.

For example, a start message 300 received by a PCE in domain AS2 (BR5*) may comprise an indication that a predecessor domain is AS1 and a successor domain is AS4. A start message received by a PCE in domain AS4 (BR12*), however, may comprise an indication that predecessor domains are AS2 and AS3, and that there are no successor domains (i.e., one or more destinations are within AS4, a destination domain).

In an illustrative embodiment, the root PCE may send a start message 300 to the furthest domain first (AS4), then work backwards sending start messages in turn to each domain upstream of the furthest domain, the next furthest domain(s), and so on. In this manner, the root PCE may attempt to ensure that all PCEs have received the start message prior to continuing to the next phase (e.g., based on propagation/transmission delay, etc.). Otherwise, future messages not related to a known P2MP path ID may be rejected by the PCEs.

—Phase III: Creating an Augmented Topology—

Upon receiving the start message in Phase II, the PCEs (other than the root PCE with no predecessors) begin waiting to receive a novel "expand message" (e.g., embodied as PCEP message 300) from a respective PCE in each predecessor domain. An expand message generally comprises the P2MP tree ID, a predecessor domain ID, and a list of border routers and associated costs to use those border routers as described below. That is, an expand message may contain a list of border routers in the local domain that could receive multicast data from the predecessor domain on the P2MP path, and also associates each border router with a cost (heuristically determined by the PCE of the predecessor domain, as described below in Phases IV and V).

Figure 6A:
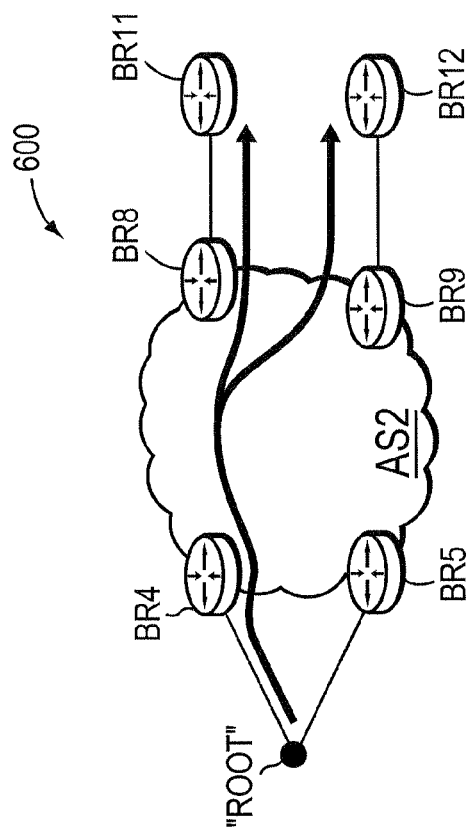
FIGS. 6A and 6B illustrate an augmented topology and computed local portions of an inter-domain P2MP path in accordance with one or more embodiments described herein.
Figure 6B:
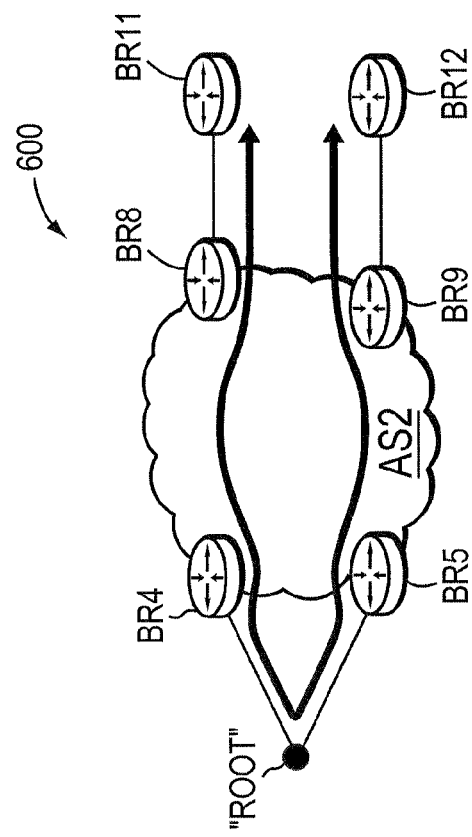

Once all expand messages from predecessor PCEs have been received, an augmented domain topology may be constructed by each PCE for its local domain (note that the root PCE may construct the augmented topology without waiting, e.g., after sending out the last start message above). An augmented topology, as used herein, is the network structure of the local domain, with an additional "root" node interconnected to ingress border routers of the local domain (notably only those reachable by a predecessor domain) by links having an associated cost as conveyed within the expand message. FIGS. 6A and 6B illustrate an augmented topology 600 of a domain (e.g., AS2) in accordance with one or more embodiments described herein. For example, as shown in FIGS. 6A and 6B, the topology of the predecessor domain(s) (e.g., AS1) is represented by a root node interconnected to each local ingress border router, BR4 and BR5. For instance (e.g., refer to FIG. 7 below), an augmented topology for AS4 may comprise a root node representing all predecessor domains (AS1, AS2, and AS3), and links to each local ingress border router of AS4 accordingly. (Note that if more than one predecessor domain could reach a particular local ingress border router, the lowest cost to reach the particular border router may be used for the augmented topology link from the root node to that particular border router.)

—Phase IV: Creating/Computing Local P2MP Trees—

In this phase, each PCE computes a tree in its respective augmented topology, where the root of the tree is the root node, and the set of destinations are either P2MP path destinations in the local domain or a set of ingress border routers of any successor domain. Any path/tree computation techniques may be used in this phase (e.g., P2MP CSPF) that is suitable to compute such a tree. An illustrative path/tree computation technique, for instance, may be configured to attempt to reach a maximum number of successor ingress border routers, but to not fail outright if certain border routers (or destinations) are unreachable. Metrics (e.g., cost) used to compute the tree may be the cost of links within the domain and the heuristic cost values received in the expand message for links added to the augmented topology in phase III.

For example, FIGS. 6A and 6B show constructed (computed) local portions of the inter-domain P2MP path/tree (thick lines and arrows) as computed by a local PCE (BR5\*) of a domain (AS2). For instance, each Figure illustrates a possible computation result of a P2MP tree from the root node (of the augmented topology) to each ingress border router of an adjacent successor domain (e.g., AS4), notably traversing only those local ingress border routers reachable by the predecessor domain(s) (e.g., assume that AS1 can reach both border routers). In particular, the Figures show options that may be the best path from the root node to each successor ingress border router. Illustratively, in FIG. 6A, both local ingress border routers BR4 and BR5 are used to provide paths to successor ingress border routers BR11 and BR12. Conversely, in FIG. 6B, only local ingress border router BR4 is used to provide paths to BR11 and BR12. Those skilled in the art will appreciate that the local path portions computed by the local PCEs are at the local PCE's discretion, and may be any chosen path (e.g., based on cost, policy, etc.). For example, it is possible for a PCE of a domain to ignore the request, and simply provide a single pass-through portion from a local ingress border router to a single successor ingress border router.

—Phase V: Communicating Heuristic Cost Per Border Router—

Once a local portion of the inter-domain P2MP tree is computed in Phase IV, the local PCE may send an expand message to the PCE in each successor domains to the local domain, again, as mentioned above, informing the successor PCEs of a list of border routers reachable in those successor domains and a heuristic cost for using those border routers. (Note that upon receipt of the expand message, the successor PCE proceeds from Phase II above.) If a border router is not reachable (e.g., for any reason, such as failure, policy, etc.), the border router is not included in the expand message. Thus if no border routers are reachable, an empty expand message may be sent to the successor domain. The costs may be computed as part of the portions of the P2MP tree as in Phase IV above, or may have an applied weight value based on local domain policy. For instance, assume that AS2 prefers that BR8 be used to reach AS4 (e.g., more suited for the traffic, less congested, etc.). Accordingly, the PCE (BR5\*) for AS2 may apply a weighted cost to the use of successor ingress border routers BR11 and BR12 in order to reflect that preference. Other weights may be applied to the cost of using border routers, such as based on a number of interconnected border routers, etc.

—Phase VI: Pruning—

Figure 7:
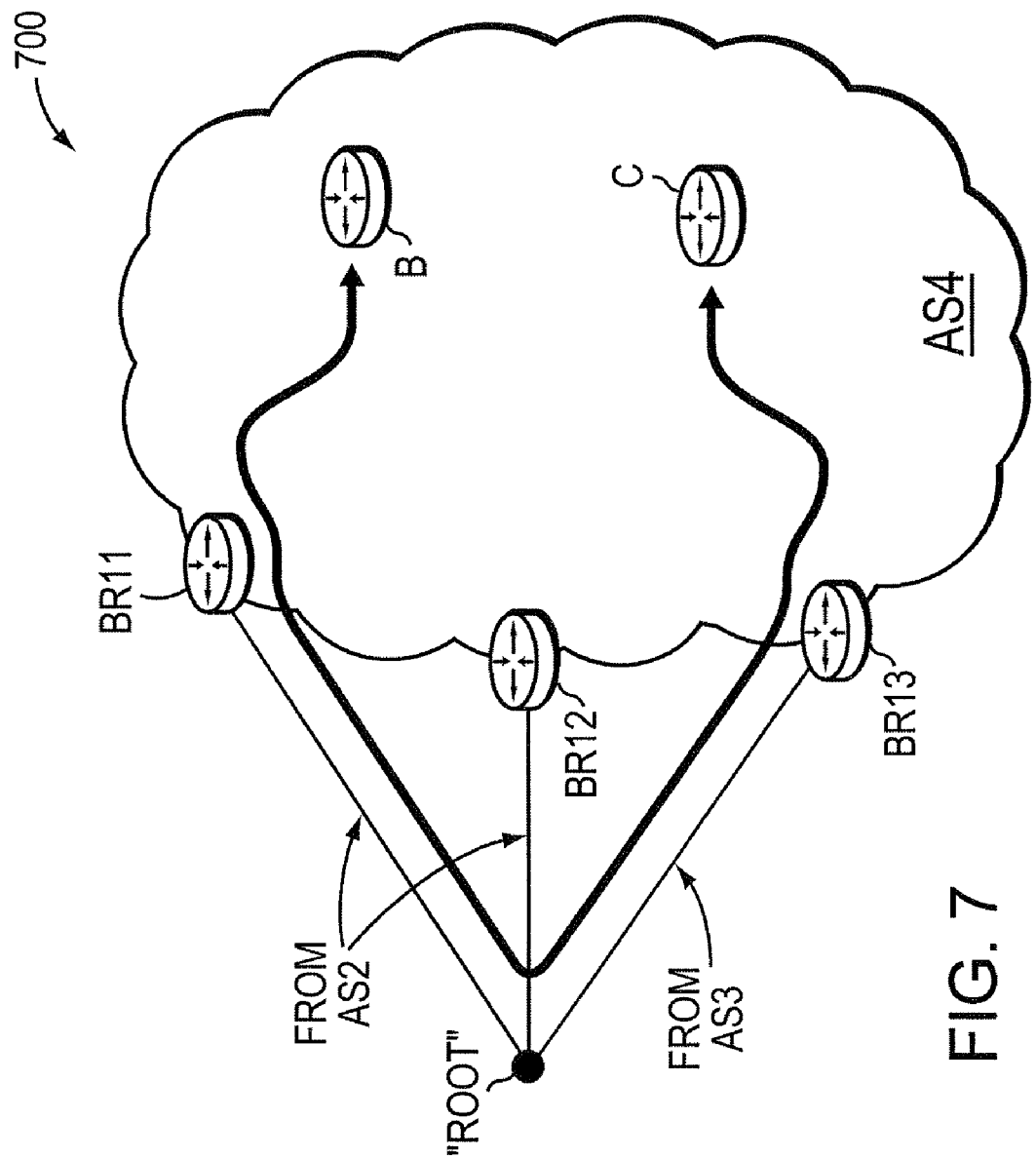
FIG. 7 illustrates an example augmented topology of a destination domain to the P2MP path destinations.

Once a final destination domain is reached (i.e., a domain with no successor domain), the local PCE of that domain (a destination PCE) may generate and send (return) a prune message (e.g., embodied as a PCEP message 300) to a PCE of each predecessor domain indicating which border routers have been used in the destination domain's portion of the inter-domain P2MP path/tree. The prune message 300 may comprise the P2MP tree ID, the successor domain ID (that is, the ID of the local domain sending the message), and a list of used border routers. For example, FIG. 7 illustrates an example augmented topology of a destination domain (e.g., AS4) to the P2MP path destinations (e.g., nodes B and C). In accordance with the creation of the augmented topology, the top two links as shown correspond to the two path options over the two connections with AS2, and the bottom link as shown corresponds to the single path option over the connection with AS3. Illustratively, the final PCE (BR12\*) may determine to use BR11 and BR13 to reach each destination node B and C respectively. Accordingly, a prune message to AS2 may contain BR11 but not BR12, and a prune message to AS3 may contain BR13. Notably, if BR13 were not used, a prune message may still be sent to AS3, but with an empty list of used border routers.

After sending an expand message described above, each PCE other than the final PCE waits for a prune message from a PCE in each successor domain. Upon receiving the prune message 300, any ingress border router not used by a successor domain (i.e., not in the list) is pruned (removed) from the local PCE's computed local portion of the P2MP tree, along with any segments of the P2MP tree that lead to unused successor ingress border routers. (Alternatively, rather than pruning segments, a PCE may recompute its portion of the P2MP tree with only those border routers used by the successor domains.)

Figure 8B:
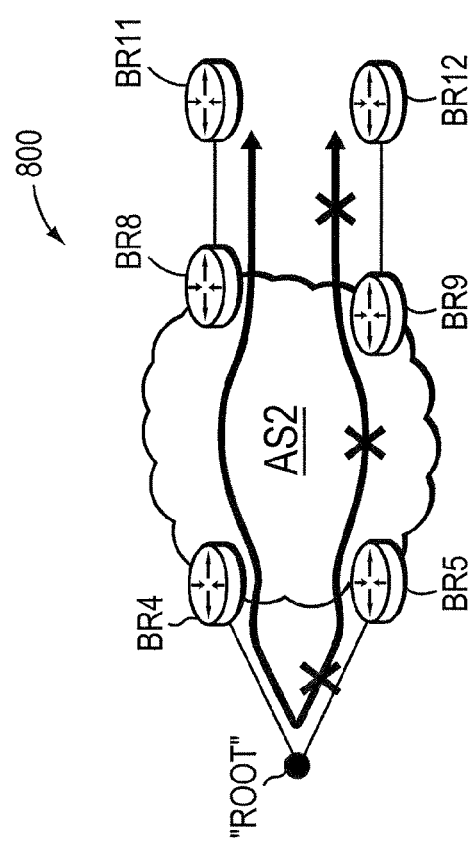
FIGS. 8A and 8B illustrate computed local portions of the P2MP path (as in FIGS. 6A and 6B, respectively) with pruned segments in accordance with one or more embodiments described herein.
Figure 8A:
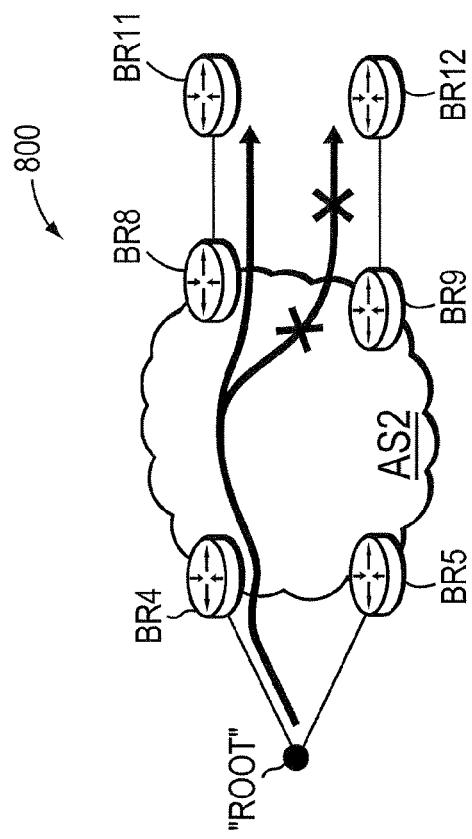
Figure 9:
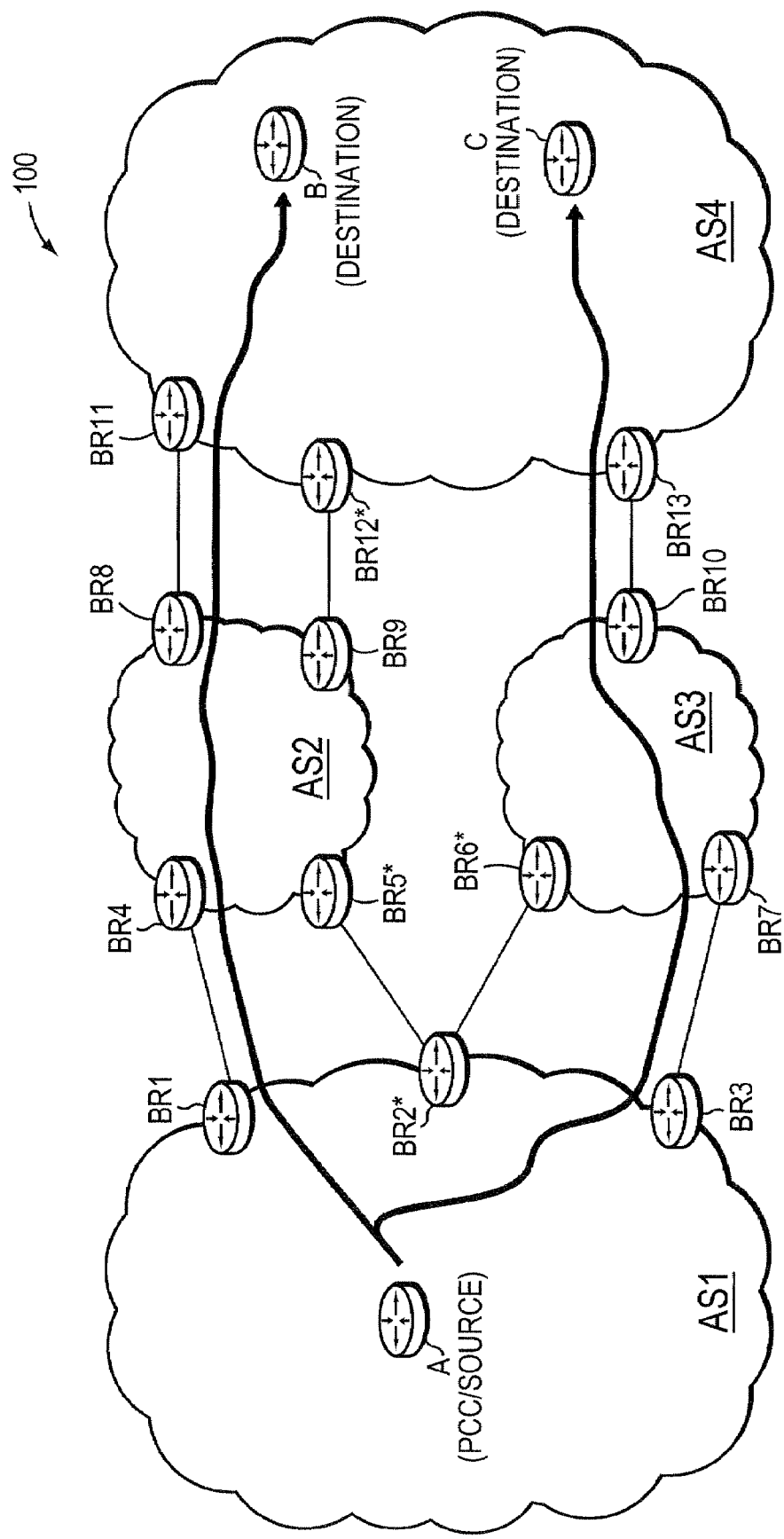
FIG. 9 illustrates an example inter-domain P2MP path as computed according to one or more embodiments described herein.

For example, FIGS. 8A and 8B illustrate computed local portions of the P2MP tree (as in FIGS. 6A and 6B, respectively) with pruned segments in accordance with one or more embodiments described herein, e.g., assuming AS2 has receive a prune message 300 indicating that only BR11 is to be used. For instance, in FIG. 8A, the PCE local to AS2 (BR5\*) may prune the successor ingress border router BR12 from its local tree portion, as well as any segments that lead to BR12 (e.g., as shown with the overlaid "X"). The same may be seen in FIG. 8B, which corresponds to a local portion option as in FIG. 6B above. As such, the local PCE may return a list of local ingress border routers used in the P2MP path once pruning is performed to each respective predecessor domain (e.g., AS1), for example, a prune message 300 indicating use of BR4 for AS2 (e.g., and BR7 for AS3, as shown in FIG. 9 below).

—Phase VII: Connecting Portions of Inter-Domain P2MP Path—

Upon pruning any unused segments of its local portion of the inter-domain P2MP path, each PCE may utilize a novel "end message" (e.g., embodied as a PCEP message 300) to communicate the final tree(s) for its local domain back to the root PCE. The end message that may be sent by each PCE to the root PCE (BR2\*) may comprise the P2MP tree ID, and a list of tree descriptions, such as loose hops through the domains or the complete path through the domain (where security is not a concern).

The root PCE receives the end message from each PCE, and connects all the locally computed path portions to form one large tree, i.e., the inter-domain P2MP path/tree from the source (node A) to the destinations (nodes B and C). For example, FIG. 9 illustrates an example inter-domain P2MP path/tree as computed according to one or more embodiments described herein. The tree descriptions of locally computed portions notably correspond to one or more ingress border routers of the local domain sending the end message 300, and one or more successor ingress border routers of a successor domain to the local domain (or P2MP path destinations). Accordingly, the root PCE may connect or join the received locally computed tree portions into the inter-domain P2MP path/tree by matching corresponding ingress border routers. For example, BR12\* of AS4 may send an end message to the root PCE indicating that BR11 is used to reach the destination node B. Also, BR5\* of AS2 may send an end message to the root PCE indicating that BR4 is used to reach BR11. In this manner, the root PCE may connect the tree in AS2 from BR4 to the tree in AS4 from BR11. In a similar manner, the root PCE may also determine and connect locally computed path portions along the path as shown through AS3.

Once the inter-domain P2MP path is computed, the root PCE may return the P2MP path to the requesting PCC. The PCC may then utilize the path, such as by establishing a P2MP tunnel (e.g., MPLS TE-LSP) over the path. For example, such a tunnel may be signaled using RSVP in a manner that will be understood by those skilled in the art.

Notably, there may be instances where a plurality of diverse/disjoint inter-domain P2MP paths is requested. As such, various extensions to the embodiments described above may be applied to provide for diverse/disjoint inter-domain P2MP path computation. For instance, if two disjoint trees are required, expand messages may contain three lists of successor ingress border routers: i) border routers where the successor PCE may decide for which of the two diverse trees the border router is to be used; ii) border routers that have been placed on one tree; and iii) border routers that have been placed on the other tree. Also, for prune messages, multiple prune messages (or multiple lists within a prune message) corresponding to the multiple disjoint trees may be used to correspondingly indicate ingress border routers used for each of the disjoint trees accordingly.

In order to ensure that the locally computed path portions are re-used for a tunnel signaled over the inter-domain P2MP path at a particular domain, particularly for diverse/disjoint trees, various techniques may be employed accordingly. For example, if the complete path is provided, such a path may be included within the signaling. However, where security and privacy of the domain internals is desired (e.g., for ASes), other techniques may be utilized. Loose hops do not generally guarantee the internal path traversed between the hops, and as such, tree portions of diverse/disjoint trees may unknowingly remerge within the domains. Accordingly, illustrative techniques that may be used accordingly are described in commonly-owned, copending U.S. patent application Ser. Nos. 10/983,327 entitled SYSTEM AND METHOD FOR RETRIEVING COMPUTED PATHS FROM A PATH COMPUTATION ELEMENT USING ENCRYPTED OBJECTS, filed on Nov. 5, 2004 by Vasseur et al., and 10/982,641 entitled SYSTEM AND METHOD FOR RETRIEVING COMPUTED PATHS FROM A PATH COMPUTATION ELEMENT USING A PATH KEY, also filed on Nov. 5, 2004 by Vasseur et al., the contents of each of which are hereby incorporated by reference in their entirety. As described therein, encrypted route objects (EROs) may be used to convey encrypted portions of the path, such that when the domain encrypting the portion receives the ERO, the domain (e.g., a border router or PCE) may decrypt the ERO and determine the originally computed local portion of the path. Also as described therein, the PCEs of each domain may store (cache) a copy of the locally computed portions, and may provide a "path key" with the loose hops, such that when the domain receives a signaling message for the tunnel with loose hops and the path key, the domain (e.g., a border router or PCE) may use the path key to look up the stored/cached locally computed portion of the P2MP path.

According to embodiments described herein, therefore, the phases described above may be utilized by a distributed PCE architecture to collaboratively compute an inter-domain P2MP path. In other words, by communicating in a direction (e.g., forward) a cost associated with select reachable border routers, and by communicating in the reverse direction (e.g., backwards) which border routers are used, an inter-domain P2MP path may be efficiently computed accordingly.

Figure 10A:
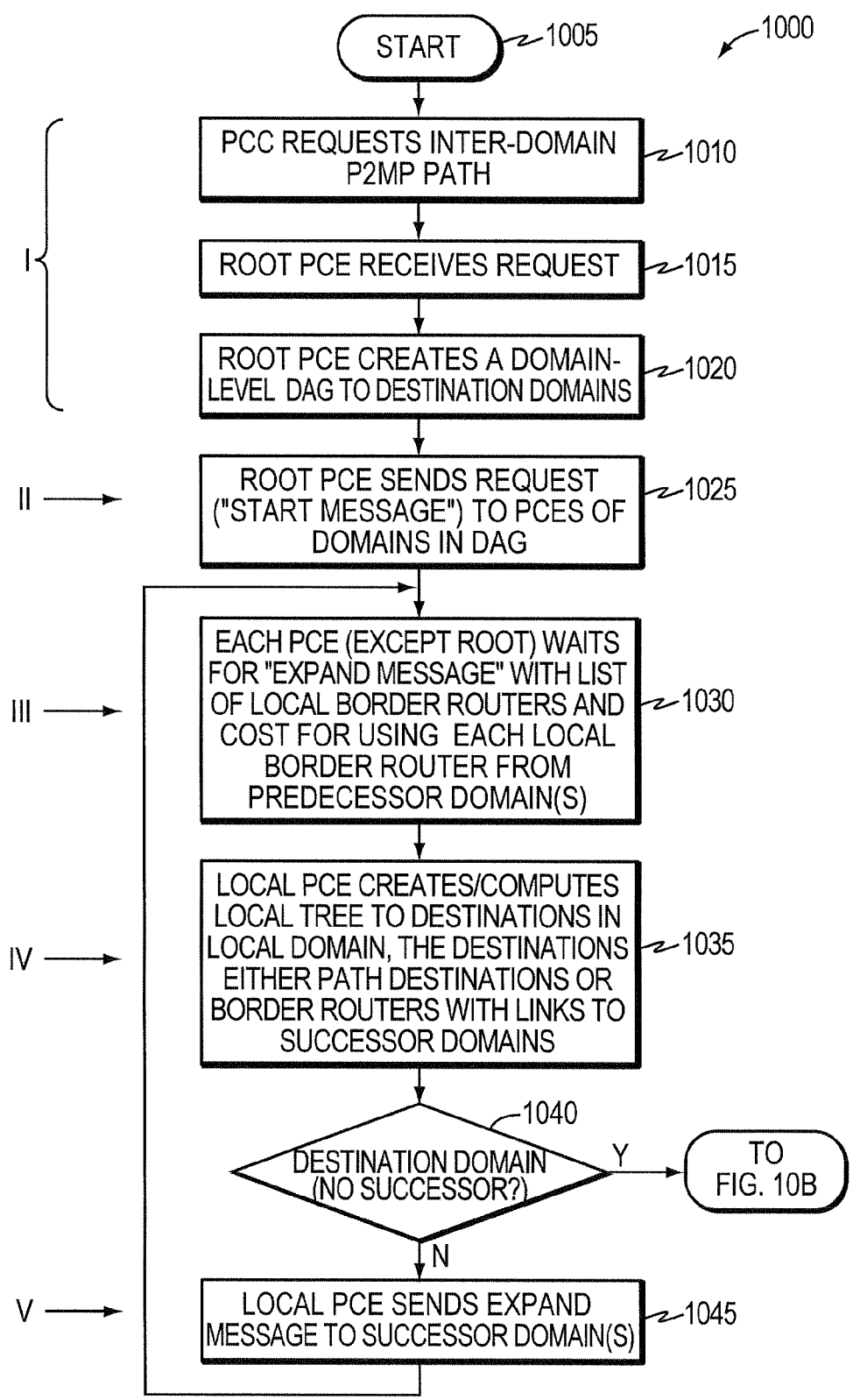
FIGS. 10A and 10B illustrate an example procedure for computing inter-domain P2MP paths in accordance with one or more embodiments described herein.
Figure 10B:
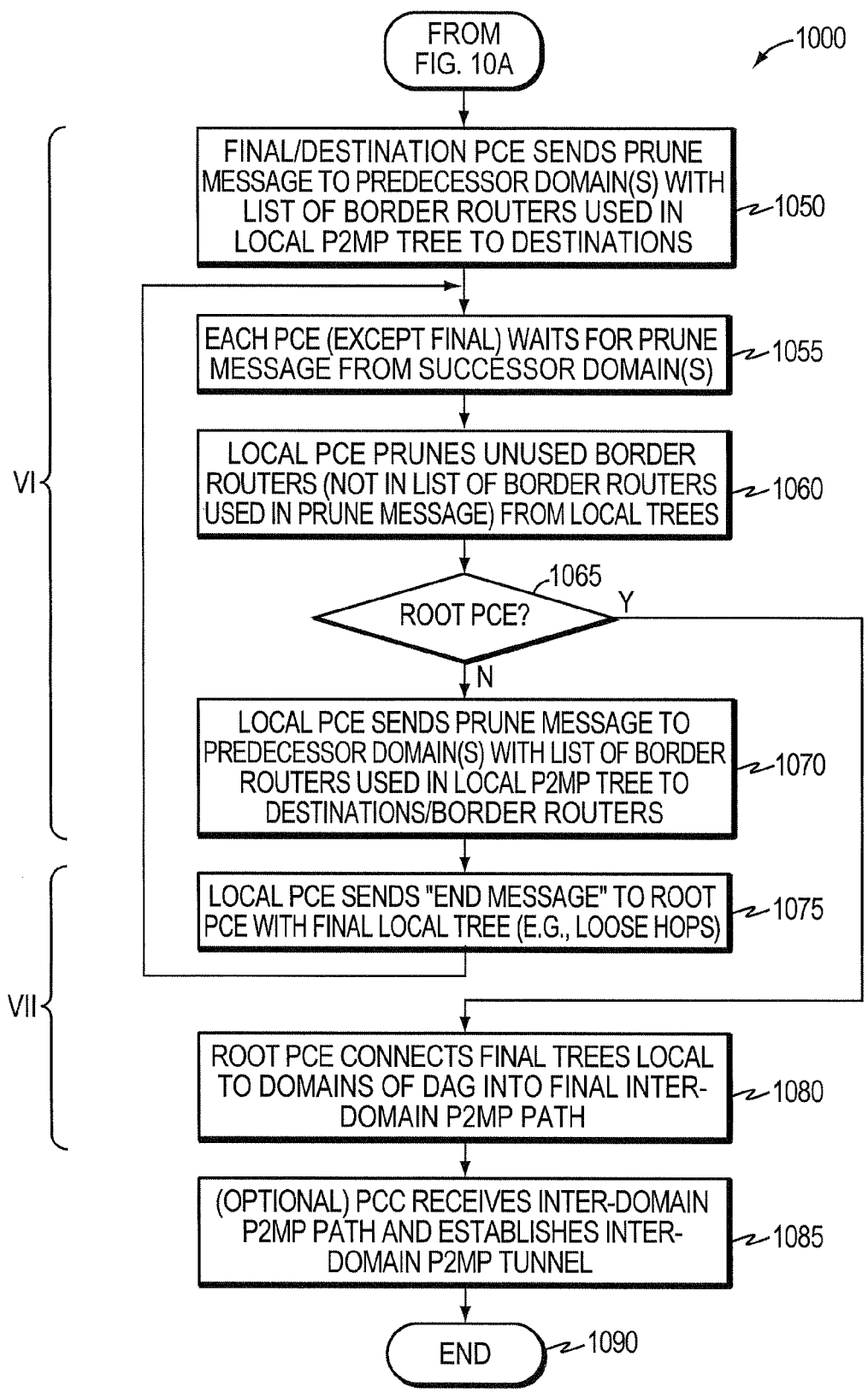

FIGS. 10A and 10B illustrate an example procedure for computing inter-domain P2MP paths in accordance with one or more embodiments described herein. (Note that corresponding phases I-VII as described above are representatively illustrated alongside the procedure.) The procedure 1000 starts in FIG. 10A at step 1005, and continues to step 1010, where a PCC in a source domain (e.g., node A in AS1) requests an inter-domain P2MP path, e.g., to destination nodes in one or more successor domains (e.g., B and C in AS4), such as through the use of PCEP message 300 described above. A root PCE (e.g., BR2) local to the PCC receives the request 300 in step 1015, and creates a domain-level DAG 500 to the destination domains (e.g., to AS4) in step 1020. Once the DAG 500 is created, the root PCE sends a request (e.g., "start message" 300) to PCEs of the domains in the DAG, indicating the inter-domain P2MP tree request and ID, as well as any predecessor and successor domains for each domain receiving the start message.

In step 1030, each PCE waits for an expand message (e.g., PCEP message 300) with a list of local border routers and cost for using each local border router from predecessor domain(s) prior to continuing to step 1035. Since the root PCE (BR2) has no predecessor domains, the root PCE need not wait in step 1030 before continuing to step 1035. Upon reaching step 1035, each local PCE creates/computes its portion of the P2MP tree (a local tree) to destinations within the local domain. As mentioned above, the destinations may either be path destinations within the local domain or border routers with links to successor domains. For example, the root PCE BR2 computes a tree from the source node/PCC (node A) to each border router of the local domain (AS1) with links to successor domains, that is, from node A to BR4 (from BR1), BR5 and BR6 (from BR2), and BR7 (from BR3).

Since the local (root) domain is not the destination domain (has successors) in step 1040, the local (root) PCE sends an expand message to each successor domain in step 1045, e.g., to PCEs for AS2 (BR5*) and AS3 (BR6*), with a list of local border routers and cost for using each local border router accordingly. The procedure returns to step 1030 for each receiving domain, where each PCE for respective local domains creates/computes its portion of the P2MP tree in step 1035, and sends corresponding expand messages to any successor domains. For instance, BR5* may compute its local tree portion to border routers of its successor domain, e.g., BR11 and BR12 of AS4, and BR6* may compute its local tree portion to border routers of its successor domain, e.g., BR13 of AS4. Once the local tree portions are computed, each PCE of each domain (i.e., with successors in step 1040) may send an expand message in step 1045 to its successor domain(s), e.g., to the PCE of AS4 (BR12*). The PCE of AS4 may receive the expand message in step 1030, and computes its local portions of the inter-domain P2MP tree in step 1035 accordingly (e.g., to the destination nodes B and C)

Once a destination domain is reached in step 1040 (i.e., a domain with no successor domains), the procedure 1000 continues to step 1050 of FIG. 10B, where the final/destination PCE (e.g., BR12*) sends a prune message (PCEP message 300) to each of its predecessor domains with a list of border routers used in its local P2MP tree to its local destinations (e.g., node B and C). In step 1055, each PCE (except for a final PCE with no successor domains) waits to receive a prune message from each of its successor domains, and upon receipt, prunes unused border routers (not in list of border routers used in prune message) from its local tree in step 1060. For instance, BR5* may receive a prune message indicating that only BR11 of AS4 is used. As such, BR5* may prune any segments of its local tree portion that lead to the unused border router BR12.

If the local PCE is not the root PCE in step 1065, the local PCE sends a corresponding prune message for its domain to each predecessor domain in step 1070 with a list of border routers used in local P2MP tree to destinations/border routers, as described above. For example, BR5* may send a prune message to BR2* of AS1 indicating that only BR4 is to be used (notably, information that BR5* may not have been able to determine without receiving a prune message from BR12 accordingly). Also, BR6* may send a prune message to BR2* indicating that only BR4 is to be used. Note that in the event a domain is both an intermediate domain (with one or more successor domains) and a destination domain (with one or more path destinations), the PCE for that domain may wait for a prune message from each of its successor domains prior to sending its prune message accordingly. Each PCE that is not the root PCE in step 1065 may also send an end message (PCEP message 300) to the root PCE (BR2*) with the final local tree (e.g., as loose hops, EROs, loose hops with path keys, etc.) as computed based on pruning performed above. The procedure 1000 continues to step 1055 where a predecessor domain PCE receives the prune message.

If the PCE is the root PCE in step 1065 (e.g., BR2*), the root PCE connects the received final trees local to domains of the DAG into a final inter-domain P2MP path in step 1080, as described above. Optionally, in step 1085, the PCC (e.g., source node A) may receive the inter-domain P2MP path and may establish an inter-domain P2MP tunnel over the path (e.g., with RSVP and PCEP signaling, etc.), as will be appreciated by those skilled in the art. The procedure 1000 ends in step 1090.

Advantageously, the novel techniques described herein compute inter-domain P2MP paths in a computer network. By using the distributed collaboration techniques described above between inter-domain PCEs, the novel techniques provide an ability to create an inter-domain P2MP path that is optimized locally within each domain. In particular, the novel techniques ensure that in each domain, there is freedom to determine the local path/tree to use, and to communicate preference about which border routers are used to create the P2MP path where there is a choice. Also, the P2MP path is not restricted to using a single border router between domains, yet avoids remerging issues as described above. Further, the dynamic aspects of one or more embodiments described herein alleviate the need for cumbersome and inefficient manual configuration.

While there have been shown and described illustrative embodiments that compute inter-domain P2MP paths in a computer network, it is to be understood that various other adaptations and modifications may be made within the spirit and scope of the present invention. For example, the embodiments have been shown and described herein with reference to particular protocol messages, such as PCEP messages 300. However, the embodiments of the invention in their broader sense are not so limited, and may, in fact, be used with other communication protocols operable in accordance with one or more embodiments described herein. Also, while the above description describes prune messages that include border routers to be used, the prune message may conversely (or additionally) indicate border routers to be pruned (i.e., not to be used). Further, while the above embodiments are described in a manner where each local PCE computes its local tree/path to successor domain ingress border routers, the PCE may simply compute the tree to the local domain's egress border routers, such that the successor domain includes any inter-domain links from the predecessor domain in its local tree accordingly.

Moreover, while the above embodiments show end messages relaying the final local trees to the root PCE, an alternative embodiment may utilize the prune messages to construct/build the P2MP path in a recursive path computation manner. For example, as described above for recursive path computation, each PCE may generate a VSPT from its domain to the destinations, based on information received from successor domains. Now, as the prune messages are sent to predecessor domains, each corresponding PCE may aggregate the successor domain paths (e.g., loose hops), prune its own local tree originally computed, and relay the combined result to the next predecessor domain(s) and so on until the root PCE is reached. Other techniques for relaying the locally computed and pruned trees may be applied to the techniques described here, and such techniques are within the scope of the embodiments described herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:

receiving, at a path computation element (PCE) of a local domain, a path computation request for an inter-domain point-to-multipoint (P2MP) path to a plurality of destinations;

receiving, from one or more adjacent predecessor domains, a cost associated with using one or more local ingress border routers of the local domain for the P2MP path;

for each destination in the local domain, i) computing a local portion of the P2MP path from one or more of the local ingress border routers to each destination in the local domain, and ii) returning a list of local ingress border routers used in the P2MP path for each destination in the local domain to each predecessor domain; and for each destination not in the local domain, i) computing a local portion of the P2MP path from one or more of the local ingress border routers to one or more successor ingress border routers of one or more adjacent successor domains, ii) computing a corresponding cost to use the successor ingress border routers, iii) informing a PCE of each successor domain of the cost associated with using the successor ingress border routers of the respective successive domains, iv) receiving a list of successor ingress border routers used in the P2MP path from each successor domain, v) pruning segments of the computed local portion of the P2MP path that lead to successor ingress border routers not in the list for the respective successor domain, and vi) for each predecessor domain, returning a list of local ingress border routers used in the P2MP path once pruning is performed to the respective predecessor domain.

2. The method as in claim 1, further comprising:
sending the computed local portion of the P2MP path without pruned segments to a root PCE.

3. The method as in claim 1, wherein the computed local portion of the P2MP path is a pass-through path.

4. The method as in claim 1, further comprising:
constructing an augmented topology based on predecessor domains upon which to compute the local portion of the P2MP path from one or more of the local ingress border routers to one or more successor ingress border routers of the one or more adjacent successor domains.

5. The method as in claim 1, further comprising:
applying a weight to the computed corresponding cost.

6. The method as in claim 1, wherein the path computation request is for diverse inter-domain P2MP paths.

7. The method as in claim 1, further comprising:
ensuring that the computed local portion of the P2MP path without pruned segments is used for a signaled tunnel over the P2MP path.

8. The method as in claim 7, wherein the step of ensuring further comprises:
utilizing encrypted route objects (EROs).

9. The method as in claim 7, wherein the step of ensuring further comprises:
utilizing loose hops and path keys.

10. The method as in claim 1, further comprising:
receiving within the path computation request a set of path destinations within the local domain, a set of predecessor domains, and a set of successor domains.

11. A method, comprising:
receiving, at a path computation element (PCE) of a root domain, a path computation request for an inter-domain point-to-multipoint (P2MP) path from a source in the root domain to a plurality of destinations;
for each destination in a local domain, computing a local portion of the P2MP path to each destination in the local domain; and
for each destination not in the local domain, i) computing a local portion of the P2MP path to one or more successor ingress border routers of one or more adjacent successor domains, ii) computing a corresponding cost to use the successor ingress border routers, iii) informing a PCE of each successor domain of the cost associated with using the successor ingress border routers of the respective successive domains, iv) receiving a list of successor ingress border routers used in the P2MP path from each successor domain, and v) pruning segments of the computed local portion of the P2MP path that lead to successor ingress border routers not in the list for the respective successor domain.

12. The method as in claim 11, further comprising:
computing a domain-level directed acyclic graph (DAG) from the source to the destinations.

13. The method as in claim 12, further comprising:
sending a P2MP path computation request to PCEs of the domains in the DAG.

14. The method as in claim 12, wherein the DAG excludes domains based on policy.

15. A method, comprising:
receiving, at a path computation element (PCE) of a root domain, a path computation request for an inter-domain point-to-multipoint (P2MP) path from a source in the root domain to a plurality of destinations;
for each destination in the root domain, computing a local portion of the P2MP path from the source to each destination in the root domain; and
for each destination not in the root domain, i) computing a local portion of the P2MP path from the source to one or more successor ingress border routers of one or more adjacent successor domains, ii) computing a corresponding cost to use the successor ingress border routers, iii) informing a PCE of each successor domain of the cost associated with using the successor ingress border routers of the respective successive domains, iv) receiving a list of successor ingress border routers used in the P2MP path from each successor domain, and v) pruning segments of the computed local portion of the P2MP path that lead to successor ingress border routers not in the list for the respective successor domain.

16. The method as in claim 15, further comprising:
receiving one or more computed local portions of the P2MP path without pruned segments.

17. The method as in claim 16, further comprising:
combining the one or more computed local portions of the P2MP path without pruned segments into the inter-domain P2MP path.

18. The method as in claim 17, further comprising:
returning the inter-domain P2MP path to a path computation client (PCC).

19. The method as in claim 17, further comprising:
establishing a P2MP tunnel over the inter-domain P2MP path.

20. A path computation element (PCE), comprising:
one or more network interfaces;
one or more processors coupled to the network interfaces and adapted to execute one or more processes; and
a memory adapted to store an inter-domain point-to-multipoint (P2MP) path computation process executable by each processor, the path computation process when executed operable to: i) receive a path computation request for an inter-domain P2MP path to a plurality of destinations; ii) receive, from one or more adjacent predecessor domains, a cost associated with using one or more local ingress border routers of the local domain for the P2MP path; iii) for each destination in the local domain, a) compute a local portion of the P2MP path from one or more of the local ingress border routers to each destination in the local domain, and b) return a list of local ingress border routers used in the P2MP path for each destination in the local domain to each predecessor domain; and iv) for each destination not in the local domain, a) compute a local portion of the P2MP path from one or more of the local ingress border routers to one or more successor ingress border routers of one or more adjacent successor domains, b) compute a corresponding cost to use the successor ingress border routers, c) inform a PCE of each successor domain of the cost associated with using the successor ingress border routers of the respective successive domains, d) receive a list of successor ingress border routers used in the P2MP path from each successor domain, e) prune segments of the computed local portion of the P2MP path that lead to successor ingress border routers not in the list for the respective successor domain, and f) for each predecessor domain, return a list of local ingress border routers used in the P2MP path once pruning is performed to the respective predecessor domain.

21. The PCE as in claim 20, wherein the path computation process when executed is further operable to send the computed local portion of the P2MP path without pruned segments to a root PCE.

22. The PCE as in claim 20, wherein the computed local portion of the P2MP path is a pass-through path.

23. A path computation element (PCE), comprising:
one or more network interfaces;
one or more processors coupled to the network interfaces and configured to execute one or more processes; and
a memory configured to store a path computation process executable by the one or more processors, the path computation process when executed to
receive a path computation request for an inter-domain point-to-multipoint (P2MP) path to extend from a source in a root domain to a plurality of destinations,
for each destination in the root domain, compute a local portion of the P2MP path from the source to each destination in the root domain, and
for each destination not in the root domain, compute a local portion of the P2MP path from the source to one or more successor ingress border routers of one or more adjacent successor domains, compute a corresponding cost to use the successor ingress border routers, inform a PCE of each successor domain of the cost associated with using the successor ingress border routers of the respective successive domain, receive a list of successor ingress border routers used in the P2MP path, and prune segments of the computed local portion of the P2MP path that lead to successor ingress border routers not in the list.

24. The PCE as in claim 23, wherein the path computation process when executed is further to compute a domain-level directed acyclic graph (DAG) from the source to the destinations.

25. The PCE as in claim 24, wherein the path computation process when executed is further to send a start message to one or more PCEs of the one or more domains in the DAG.

26. The PCE as in claim 23, wherein the path computation process when executed is further to receive one or more computed local portions of the P2MP path without pruned segments.

27. The PCE as in claim 26, wherein the path computation process when executed is further to combine the one or more computed local portions of the P2MP path without pruned segments into the inter-domain P2MP path.

28. The PCE as in claim 27, wherein the path computation process when executed is further to return the inter-domain P2MP path to a path computation client (PCC).

29. A path computation element (PCE), comprising:
means for interfacing with a network;
means for executing instructions; and
means for storing instructions that when executed:
receives a path computation request for an inter-domain point-to-multipoint (P2MP) path to extend from a source in a root domain to a plurality of destinations,
for each destination in the root domain, compute a local portion of the P2MP path from the source to each destination in the root domain, and
for each destination not in the root domain, compute a local portion of the P2MP path from the source to one or more successor ingress border routers of one or more adjacent successor domains, compute a corresponding cost to use the successor ingress border routers, inform a PCE of each successor domain of the cost associated with using the successor ingress border routers of the respective successive domain, receive a list of successor ingress border routers used in the P2MP path, and prune segments of the computed local portion of the P2MP path that lead to successor ingress border routers not in the list.

* * * * *